Patented Jan. 18, 1949

2,459,566

UNITED STATES PATENT OFFICE 2,459,566

PENETRATING AQUEOUS SULFUR COMPOSITION FOR THE TREATMENT OF SKIN DISORDERS SUCH AS ACNE

Slaughter Warren Lee, Princeton, N. J., assignor to Wallace Laboratories, Inc., New Brunswick, N. J., a corporation of Delaware No Drawing. Application June 12, 1946, Serial No. 676,359

1 Claim. (Cl. 167—58)

This invention relates to therapeutic compositions comprising sulfur and more particularly to active sulfur solutions having a high skin penetrating power.

Sulfur has been proposed for many years in the treatment of skin disorders. This is effective in the treatment of the superficial layers of the skin with which the sulfur comes in contact. However, its effect is not carried to any great extent into the diseased area such as the deeper parts of the follicles and the sebaceous glands of the skin.

In accordance with the invention, a highly penetrating sulfur solution has been found, and the sulfur therein is in the active polysulfide form. This solution has a high skin penetrating power and enables the therapeutic agent to reach even the deeper seated diseased areas of the skin, such as the entire length of the follicles and the sebaceous glands.

The objects achieved in accordance with the invention include the provision of a solution of sulfur having high skin penetrating power and containing the sulfur in a therapeutically active form; and other objects which will be apparent in view of the following disclosures.

A preferred formulation is the following:

| | Weight parts |
|---|---|
| Sulfur | 7.5 |
| Sodium alkyl benzene sulfonate | 110 |
| Antipyrine | 54 |
| Triethanolamine | 100 |
| Propylene glycol | 560 |
| Water | 168.5 |

The triethanolamine in the composition acts primarily to place the sulfur in solution in an active polysulfide form. Equivalent alkaline materials may be used to replace triethanolamine for this purpose.

The alkyl benzene sulfonate imparts the penetrating properties to the composition. Equivalent wetting agents may be used in place of the particular one selected. The antipyrine acts as a coupling agent to bring the diverse components into solution and an equivalent compound for this purpose similarly may be substituted. The propylene glycol acts as an humectant and organic solvent and equivalent materials for this purpose similarly can be substituted.

The above example represents the preferred proportions but these may be varied depending primarily on the amount of sulfur it is desired to incorporate in the composition, the extent of the penetrating action desired, and the humectant properties the composition is to have with reference to the skin. The proportions are not critical for these reasons, and may be varied within such ranges as will accomplish the function of the components for the purpose for which they are included in the composition, as will be obvious to one skilled in the art in view of this disclosure. In general it may be said that the proportions may vary plus or minus 25% from the optimum amounts listed above.

The solution may be prepared by adding sulfur to the triethanolamine, with agitation and heating at about 70° to 80° C. for about 100 to 120 minutes. The other ingredients are mixed together, and then the mixture is added to the sulfur-triethanolamine solution with agitation and heating at 80° to 90° C. for 50 to 60 minutes. After mixing is completed, the composition may be placed in clean sterilized glass containers.

The new composition has been tried by others on over 130 clinical cases of various types of acne vulgaris, and the results published. In most cases there was marked improvement and in some a complete cure. There were practically no recurrences after cure and there was less than one percent thereof showed development of secondary infections.

The new composition is a valuable preparation for treatment of all types of skin disorders, such as acne vulgaris, and, in view of the tests, appears to be superior to the conventional remedies for the treatment of this disease.

I claim:

An aqueous therapeutic solution for the treatment of acne and other skin disorders and containing sulfur in an active therapeutic form, comprising the following ingredients in amounts ranging 25% below and above the following optimum amounts:

| | Parts by weight |
|---|---|
| Sulfur | 0.75 |
| Sodium alkyl benzene sulfonate | 11.00 |
| Antipyrine | 5.40 |
| Triethanolamine | 10.00 |
| Propylene glycol | 56.00 |
| Water | 16.85 |

SLAUGHTER WARREN LEE.

(References on following page)

REFERENCES CITED

The following references are of record in the file of this patent:

UNITED STATES PATENTS

| Number | Name | Date |
|---|---|---|
| 2,114,370 | Bickenheuser | Apr. 19, 1930 |
| 2,149,249 | Nitsche | Feb. 28, 1939 |
| 2,201,124 | Ehman et al. | May 14, 1940 |

OTHER REFERENCES

McKee et al., The Journal of Investigative Dermatology, vol. 5, No. 5, Oct. 1945.

Powers Bulletin of the National Formulary Committee, vol. X, No. 89, Aug.-Sept. 1942, page 189.

Vallance, "Some Make-up Specialties," Manufacturing Chemist, June 1940, page 168.

Herrmann, Science, Nov. 13, 1942, pages 451-2.